United States Patent [11] 3,551,610

[72] Inventors Michel Georges Andre Pichot Conflans-Sainte-Honorine; Raymond Jacques Charles Roquet, Saint-Remy les-Chevreuse, France
[21] Appl. No. 652,206
[22] Filed July 10, 1967
[45] Patented Dec. 29, 1970
[73] Assignee Lignes Telegraphiques & Telephoniques Paris, France
[32] Priority July 27, 1966, July 30, 1966
[33] France
[31] Nos. 71,013 and 71,577

[54] DEVICES FOR DISTANT SUPERVISION OF THE WORKING CONDITION OF TELEPHONE LINES REPEATERS BY MEANS OF LOCAL GENERATORS ASSOCIATED THEREWITH
6 Claims, 5 Drawing Figs.

[52] U.S. Cl. ........ 179/175.31
[51] Int. Cl. ........ H04b 3/46
[50] Field of Search ........ 179/175.31

[56] References Cited

UNITED STATES PATENTS

| | | | |
|---|---|---|---|
| 2,018,850 | 10/1935 | Green et al. | 179/175.31 |
| 2,564,010 | 8/1951 | Jacobs | 179/175.31 |
| 3,054,865 | 9/1962 | Holloway et al. | 179/175.31 |
| 3,297,833 | 1/1967 | Hooten | 179/175.31 |

FOREIGN PATENTS

| | | | |
|---|---|---|---|
| 1,038,672 | 8/1966 | Great Britain | 179/175.31 |

*Primary Examiner*—Kathleen H. Claffy
*Assistant Examiner*—David L. Stewart
*Attorney*—Waters, Roditi, Schwartz & Nissen

ABSTRACT: Devices for selectively supervising from a distant main receiving station unattended repeaters inserted in a telephone circuit by means of a direct or alternating control current transmitted from said main station and causing test signals from a local generator associated with each of said repeaters to be successively applied to the input thereof in the order of the increasing distances of said repeaters from said main station, in which the time of application and duration of said test signals are either automatically or manually controlled at said main station, and in which each of said generators is operated by delayed action control means and immediate or delayed switching means controlled by said control current.

PATENTED DEC 29 1970 3,551,610

SHEET 1 OF 4

DEVICES FOR DISTANT SUPERVISION OF THE WORKING CONDITION OF TELEPHONE LINES REPEATERS BY MEANS OF LOCAL GENERATORS ASSOCIATED THEREWITH

BACKGROUND OF THE INVENTION

1. Field of the Invention

This invention relates to methods and devices for the selective supervision of a number of repeater stations set up at intervals along a unidirectional communication circuit, for instance a long-distance telephone circuit. The circuit proper will hereinafter be called, for short, "the transmission line," or even "the line." Supervision is effected from a main station situated at the receiving end of the line and provided with operating personnel, without any interruption of the operation of the line for its normal communication purposes. The arrangements according to the invention make it possible to locate a faulty line section by observing measuring instruments provided at said main station. By "line section" is to be understood any part of a one-way communication circuit which includes a given repeater and the associated "elementary amplification section," that is the length of line immediately connected between the output of said given repeater and the input of the next repeater in the transmitting direction of the communication circuit.

The operation of the systems of the invention is based on the known technique which consists in sequentially applying at the inputs of the various repeaters test signals consisting of sinusoidal alternating currents having a frequency capable of being transmitted through the repeaters without interfering with the communication signals transmitted therethrough. Said test signals are supplied by local generators individually associated with each one of said repeaters, and are fed to the input of the latter at a predetermined level. Said frequency may be the same for all generators or differ from one generator (and associated repeater) to the next one. The so produced test signals are normally received at said main station at a predetermined level, the measurement of which shows whether the concerned repeater is properly operating or not. Sequential testing of the repeaters begins with that one of the latter which is nearest to said main station and continues by taking all repeaters in the order of their increasing distances from the latter.

The advantages of the sequential method of repeater testing, in comparison with that which uses simultaneous testing with the aid of a number of different frequencies, are well known and hardly need to be underlined here: greater simplicity of the test equipment, reduced number of frequency filters, and prevention of possible overloading of the repeaters by the simultaneous presence of a number of test signals.

2. Description of the Prior Art

In the French Pat. No. 1,351,259, for instance, there is described an arrangement using test signals supplied from a local generator associated with each repeater. The various generators are put in service in turn by means of a direct current control voltage which successively takes, step-by-step, a number of increasing discrete values. Voltage threshold devices inserted in a control line between any two successive repeater stations cause one generator at a time to be connected to the input of one corresponding repeater for any given value of the control voltage, while the preceding generator, corresponding to the next lower value of the latter voltage, is disconnected.

A more or less similar system, applicable to a four-wire multiple channel carrier-current circuit, is described in the German Pat. No. 1,223,891.

In the U.S. Pat. No. 3,054,865 to D. G. Holloway and G. E. Parrett, there is described an arrangement for a similar purpose, applicable to a four-wire communication circuit including unattended repeaters power fed from a main station. The test signals for each one of the repeaters are automatically and successively transmitted at the time when the power is first applied to the system, with the aid of switching means provided therefor. When no power is applied, a suitably dimensioned resistor interconnects two conductors respectively pertaining to the "go" and "return" portions of the power supply circuit at each repeater station. When the power is applied, a relay disconnects the resistor. The various resistors associated with the corresponding repeaters are so dimensioned that the relays, which are of a slow action type, operate at time intervals in the successive repeaters. The disconnection of each resistor causes a capacitor to be discharged, and the voltage variation across said capacitor in turn causes a local generator to be energized for a short time and to transmit a test signal to a receiving device provided at said main station.

The invention also makes uses of local test signal generators individually associated with each repeater and of the time-staggered connection of each of said generators to the input of the associated repeater. However, the invention differs from the known systems in that it uses a different method to ensure the staggering in time of the operation of said generators. According to the invention, a constant control voltage or current is supplied from the main station, with the aid of a manually operated switch, to a control circuit fed from a separate power source, independent of the power supply of the repeaters. This control circuit can thus be made operative at any desired time, not only at the time when power is first applied to the repeaters. Proper timing, is obtained in the operation of the test signal generators by means of automatic devices including a relay and an auxiliary circuit for releasing the latter after a predetermined time for fulfilling at each repeater station the necessary switching functions at constant and predetermined time intervals, each of the latter devices controlling the operation of the next one, in the order of their increasing distances from said main station. The control voltage or current only needs to be applied when testing is desired, and this may be effected at any time without disturbing the normal operation of the communication circuit.

SUMMARY OF THE INVENTION

According to the present invention, there is provided, in a communication circuit having a transmitting far end and a receiving near end and including a plurality of unattended repeater stations located according to their increasing rank at increasing distances along said circuit from said near end and from a main station located at said near end, each of said unattended stations including a repeater having an input and an output with its amplification direction from said far end to said near end, a distant supervision system allowing said repeaters to be separately and successively tested from said main station, said supervision system comprising:

test signal supply means at each of said unattended stations for supplying thereto a test signal alternating current capable of being transmitted through said communication circuit;

a control current source and a manually operated switch for said source at said main station for applying said control current to a control circuit arranged along a path substantially coinciding with that of said communication circuit;

at each of said unattended stations, local switching means including a relay having a winding operated by said control current from said control circuit for connecting through said relay said test signal supply means to said input of said repeater and for switching off the part of said control circuit which extends toward the far end of said communication circuit delayed action switching means controlled through said two-wire circuit by said control current at each of said unattended stations for releasing after a predetermined time interval said relay and switching in again said part of said control circuit;

said local switching and delayed action means being so arranged as to successively operate in the order of the increasing ranks of said unattended stations; and measuring instrument means provided at said main station for checking the level of the test signals received at said main station through said repeaters and said communication circuit.

The arrangements of the invention are further characterized in that said delayed action switching means include a transistor, the collector-emitter path of which is series connected with said winding between the two wires of said two-wire circuit and the base-emitter a path of which is series connected with the series assembly of a resistor and a capacitor between latter said wires.

According to a first mode of embodiment of the invention, said control circuit consists of an auxiliary metallic circuit independent of the repeatered communication circuit. Said control current may be a direct current or an alternating current of arbitrary frequency, for instance a voice frequency. In the case where alternating current is used rectifying means may be provided for the purpose of more easily operating said relay and local switching and delayed action means. A local test signal generator, power supplied from the control current circuit, is used at each repeater station.

According to another mode of embodiment of the invention, more particularly applicable to a four-wire communication system including a "go" and a "return" repeatered communication circuit, said "go" circuit is used as the control circuit and the control current is an alternating current of a frequency capable of being transmitted through the repeaters of said "go" circuit but so selected as to avoid disturbing their operation for the useful communication signals. The "return" circuit then is the circuit, the repeaters of which are to be successively tested by means of the system of the invention. In this case, the control current itself may advantageously be employed, at each unattended station, as the test signal current.

According to a preferred mode of embodiment of the invention, hereinafter called "automatic transfer system," the various repeaters are automatically and successively tested as soon as a control current is applied to the control circuit at said main station, this being obtained by means of a suitable arrangement of the above said delayed action switching means.

According to still another mode of embodiment of the invention, hereinafter called "manual transfer system," the control current is applied to the control circuit by means of the above-mentioned manually operated switch. By momentarily releasing the latter switch, a short interruption of said control current takes place, which causes the above-mentioned delayed action means to interrupt the testing of the just tested repeater and to switch in again the control circuit beyond the latter repeater. By operating again said manually operated switch, the operation of the system is shifted from one rank to the next in the order of the increasing distances of the unattended stations from the controlling main station, and so on.

Other features and advantages of the invention will be better understood from the hereinafter given detailed description, made with the aid of the annexed drawings.

DESCRIPTION OF THE PREFERRED EMBODIMENTS

Figure 1:
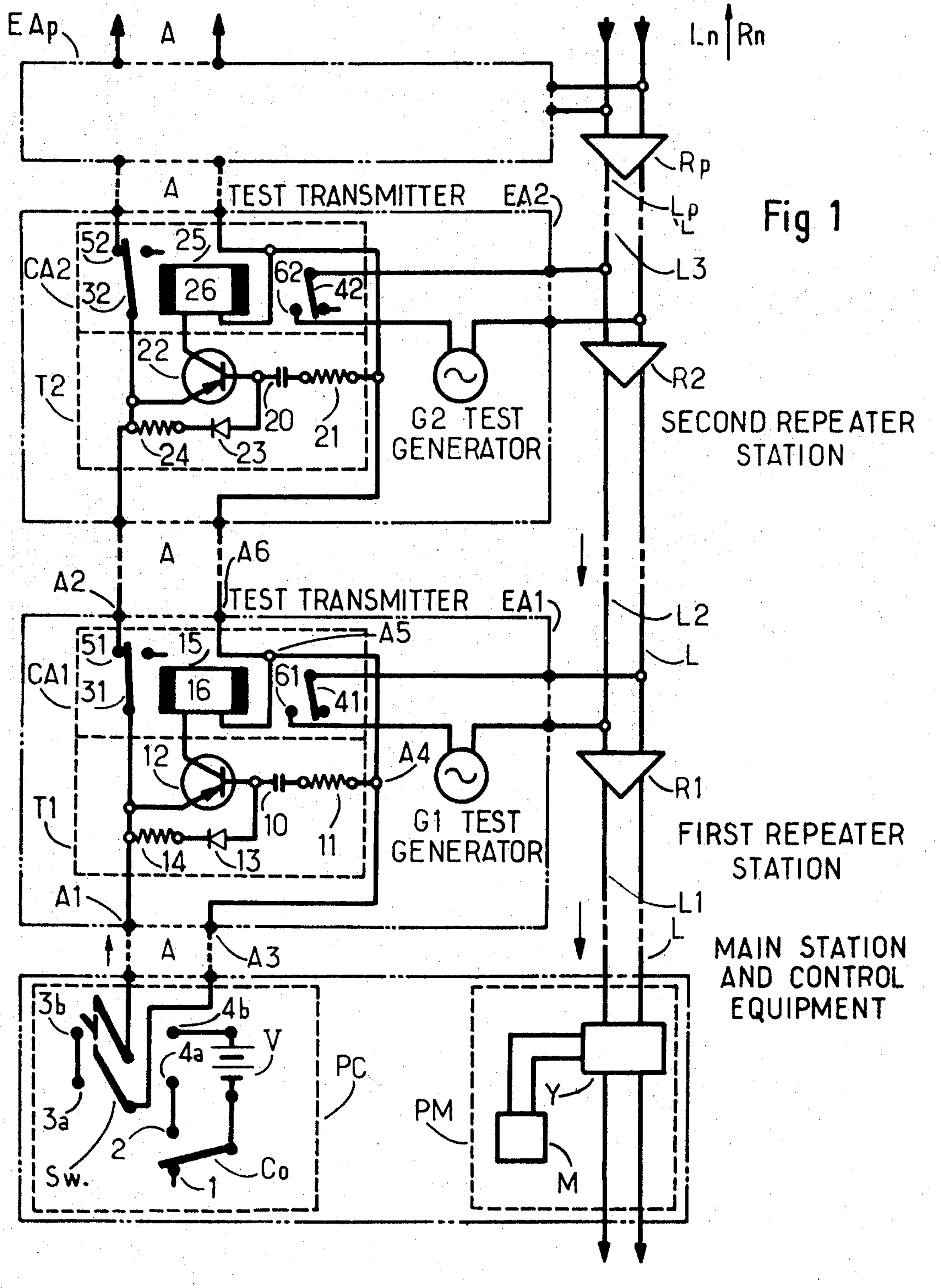
FIG. 1 schematically shows an embodiment of the distant supervision system of the invention, of the so-called "automatic transfer" type.

Referring first to FIG. 1, the symbol L designates a transmission line, including elementary amplification sections L1, L2 ...., L*p*, ..... l*h*, to the input of each of which a repeater R1, R2,.... R*p*, ..... R*n* is connected. In the drawing, only the first and second repeaters R1 and R2 (taken from the receiving end of the line in the order of the increasing distances) and the farthest repeater R*p* are shown.

A is the control circuit transmitting the control current, a direct current in the present case. Along said control circuit are located test signal generators EA1, EA2, ... EA*p*, ... EA*n*, respectively associated with repeaters R1, R2 ... R*p* ... R*n*. In the drawing, only the two first of said generators are shown.

A control unit PC is arranged at the near end of the control circuit A, near the receiving end of the transmission line L. Said control unit includes a direct current source V, the polarity of which is so selected as to power supply with the suitable polarity the test generators arranged along circuit A. A manually operated switch C*o*, for instance a Morse key having a rest position 1 and a work position 2, and a two-position switch S*w*. which takes the position 3*a*–3*b* when the control unit is not in use, are also provided. In the rest position of S*w*., the control circuit A is short circuited at its near end, while, at the beginning of a testing operation, switch S*w*. is given the position 4*a*–4*b*.

A measurement unit PM provided at the receiving end of transmission line L includes filtering means Y for separating the test signals from the communication signals, together with other means M allowing to measure the level of the received test signal currents.

At the two nearest unattended repeater stations are respectively found control devices T1 and T2 providing time constants, switching means CA1 and CA2, and test signal generators G1 and G2 included in the test transmitters EA1 and EA2.

In the embodiment shown in FIG. 1, the delayed action providing device T1, connected across the control circuit A, comprises a capacitor 10 in series connection on one hand with resistor 11, and on the other hand with the base-emitter path of transistor 12, the direction of the direct current in circuit A being so chosen that said direct current flowing through said path charges capacitor 10, while in the reverse direction said path is blocked and offers a high resistance to the discharging of capacitor 10. A unidirectional conduction circuit including a diode 13 in series-connection with a resistor 14 is connected across said base-emitter path and provides a discharge path for capacitor 10 at the end of a measuring operation, when the equipment returns to its rest position, but prevents the charging of said capacitor when the direct current control voltage is applied to the input of the control device T1, at terminals A1 and A3, at the beginning of this measuring operation.

Transistor 12, shown as of the p-n-p type in FIG. 1, might as well be of the n-p-n type, subject to the condition of inverting the polarity of the direct-current source V in the control unit PC.

The switching member CA1 consists of a relay 15, provided with an energizing winding 16 into which the collector current of transistor 12 flows and with two movable armatures 31 and 41 respectively bearing a rest contact 51 and a work contact 61. Armature 31 ensures the continuity of the control circuit A when relay 15 is in its rest position, while armature 41 provides a connection between test generator G1 and repeater R1, when relay 15 takes its working position.

Elements of the test transmitter EA2 similar to 11—16 of EA1 are similarly designated by two-digit reference numbers; the unit digits are the same as for the corresponding elements of the test transmitter EA1, but the tens digit is always 2. The armatures and the work and rest contacts are designated by the same letters as the corresponding elements of relay 15, but with the second digit changed from 1 to 2. A similar notation would be used for the test transmitters EA3, EA4, etc., not shown in the drawing.

In the rest condition of the system, switch Sw. assumes position 3a–3b, and all capacitors such as 10, 20, etc., are uncharged.

To put the system into its test and measuring position, the operator puts the two-position switch Sw. in the position 4a–4b, while switch Co remains in position 1. The state of the circuit then is that shown in FIG. 1, and continuity of the control circuit A is ensured by armatures 31, 32, etc., while the armatures 41, 42, etc. respectively sever the connections between the test generators G1, G2 and repeaters R1, R2, etc.

When the operator brings switch Co to position 2 and keeps it in the latter position, a direct control current appears in circuit A. Capacitor 10 is charged at a rate depending on the resistances included in its charging circuit. At the beginning of the charging, the charging current intensity which flows through the emitter base path of transistor 12 from points A3 and A4 to point A1 is comparatively high and, by virtue of the amplifying action of the transistor, the current intensity flowing through the energizing winding of relay 15 almost immediately reaches such a value that said relay attracts its armatures 31 and 41. The control circuit A is then cut off at the output A2, A5, A6 of the test transmitter EA1 and, at the same time, an alternating test current generated by the test generator G1 is applied to the input of repeater R1.

During the further charging of capacitor 10, its charging current intensity decreases. After a certain time interval which depends on the values of the resistances inserted in the charging circuit, the energizing current flowing through winding 16 becomes too weak to continue attracting armatures 31 and 41, and the latter fall back to their rest position. The test current from G1 ceases to be applied to R1 and, simultaneously, circuit A returns to its continuity condition toward terminals A2 and A6 and the test transmitter EA2.

Capacitor 10 remains in its charged condition as long as switch Co, remaining in position 2, continues connecting the direct current source V to its utilization circuit A. Relay 15, being no longer sufficiently energized, remains in its rest position, and the direct current supplied by source V is then applied to the input of the test transmitter EA2 associated with repeater R2. Transmitter EA2 is operated in the same manner as EA1 previously was and thereafter passes, as the latter previously did, to a standby position in which capacitor 20 remains in a charged condition, while relay 25, no longer sufficiently energized, remains in its rest position. The test transmitter EA3, not shown in the drawing, is thereafter operated in the same manner as EA1 and EA2 previously were, and so on from each repeater to the next one, up to the last repeater Rn in the transmission line L.

The supervision system of FIG. 1, herein called "automatic transfer system" thus provides for the automatic operation, at predetermined time intervals, of the successive test transmitters. Measuring of test signal levels must consequently be effected, at the receiving main station, according to a timing defined by the time constant providing devices (delayed action means) T1, T2, which have once for all been adjusted for this purpose.

After the termination of all level measurement, the operator must bring switch Co back to its rest position 1, and thereafter put all the equipment back to its "zero position" by short circuiting the input to the control circuit A by means of the two-position switch Sw. which should then be brought to position 3a–3b.

All capacitors 10, 20, etc. are respectively discharged through circuits such as 13–14, 23–24, etc., and the parts of the control circuit A comprised between each one of the test transmitters and switch Sw. After the termination of the discharging, the system returns to its initial state and is prepared for a new series of measurements.

To measure the level of each of the test signal currents which are successively received at the receiver station, the operator is allowed a time interval determined by the charging rate of capacitors 10, 20, etc. This time interval may be the same for all test transmitters, or it may differ from one to the other of them. Suitable determination of the electrical elements which define the time constants may be effected by well-known methods. By way of example, good results have been obtained, in practice, with the following values:

| | | |
|---|---|---|
| Capacitor charging time | seconds | 5 |
| Capacitor discharging time | do | 50 |

The 5-second charging time is the time available for the operator to read the measurement result corresponding to a given repeater and, if wanted, to record said result, before the succeeding signal appears for another 5-second duration. Of course, this requires a skilled operator; if a serious fault is detected, it may be of interest to keep the measuring equipment PM (FIG. 1) in its reading condition for a longer time, for a given repeater.

For this purpose, the following arrangement may be provided.

Figure 2:
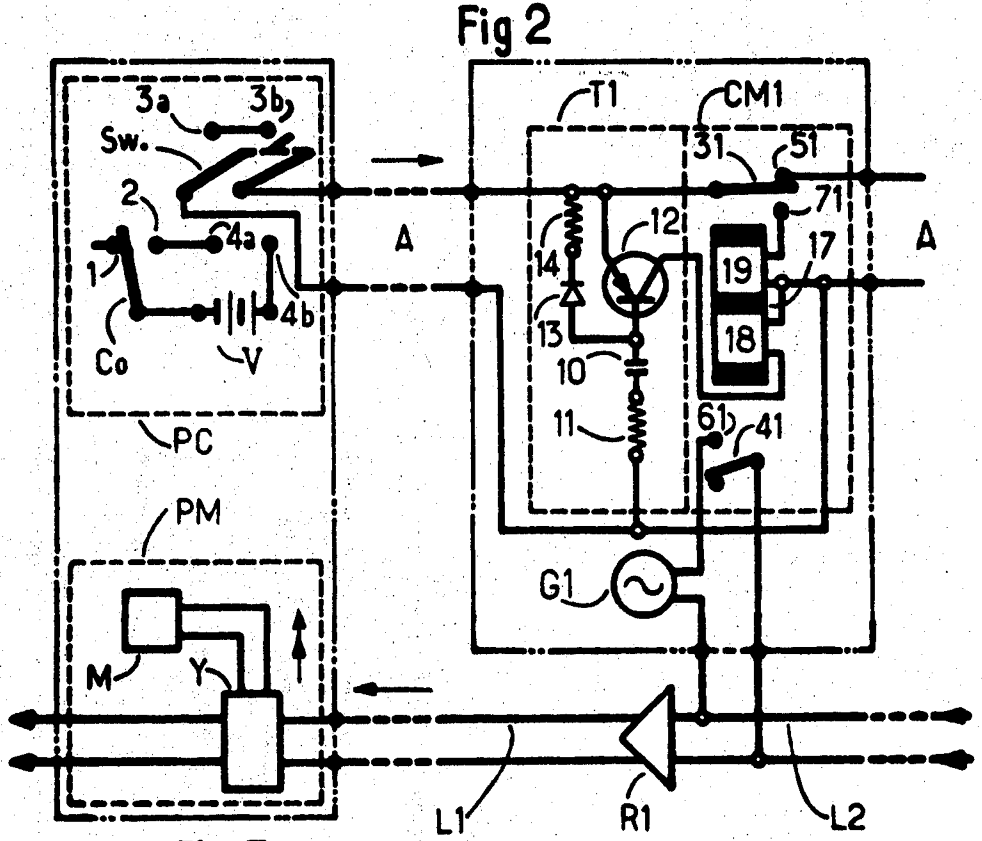
FIGS. 2 and 3 schematically show other embodiments of the system of the invention, of the so-called "manually operated transfer" type.

FIG. 2 shows a variant, hereinafter called "manual transfer type" of the arrangement of FIG. 1 In FIG. 2 the elements which are the same as in FIG. 1 are designated by the same reference numbers as in the latter. The elements which have been modified and the associated switching elements, such as the test transmitters and switching means, are designated by new references such as EM1, EM2 and CM1, CM2, respectively.

In FIG. 2 relays such as 17 include a winding 18 playing the same part as winding 16 of FIG. 1 with respect to armatures 31, 41 and contacts 51, 61; a complementary winding such as 19 (FIG. 2) is provided as a holding winding and is connected to an extra work contact, such as 71.

The operation of the distant supervision system of FIG. 2 is as follows:

At the beginning of the operation, the whole system being assumed to be in its rest position, with the capacitor uncharged, the operator puts the two-position switch Sw. in position 4a–4b and the switch Co in position 2. The direct control current flows through the control circuit A, capacitor 10 in the transmitter EA1 is charged, and relay 17 is brought to its work position and disconnects the part of A which extends beyond the repeater. At the same time, the test current from generator G1 is directed to the input of repeater R1, and the holding winding 19 is energized through armature 31 and contact 41 and holds the relay in its work position. This situation persists for all the time during which switch Co is kept in position 2 by the operator. The operator thus controls the time during which he will be able to read the measured value of the received test current. It will be assumed that switch Co will thus be left in position 2 for a time longer than that which is needed for the charging of capacitor 10.

To cause the next test transmitter EM2 (not shown in the drawing) to be put in service, the operator momentarily suppresses the direct control current by bringing switch Co back to position 1, and thereafter reestablishes the current by bringing again the latter switch to position 2. The interruption in the current must be short enough to leave capacitor 10 in the charged condition, taking account of the possibility of slow discharge through transistor 12 and leakage.

During the interruption of the control current, the holding winding 19 is no longer energized and the armatures of relay 17 are released.

At the time when the control current flows again, capacitor 10 having retained its charged condition, relay 17 is no longer energized and its armatures remain in their rest position. Continuity of the control circuit A toward transistor EM2 obtains again, and the latter transmitter operates in the same manner as transmitter EM1 previously did when the operator put switch Co in position 2 for the first time. The test current from generator G2 is applied to the input of repeater R2, and the control circuit part extending toward a still further transmitter is disconnected. To put the latter circuit part in service again, the same operations are repeated in the same order (short interruption of the control current and subsequent reestablishing by means of switch Co), the same sequence of operations being repeated for each one of the successively tested repeaters and the instants at which each one of the transmitters EM1, EM2, etc. is put in service or disconnected being selected at will by the operator.

At the end of a measurement series, the operator proceeds, in the same manner as in the automatic transfer system, to the discharging of the capacitors started by putting switch *Sw.* in position *3a–3b*, and the system is prepared for a new measurement series.

Figure 3:
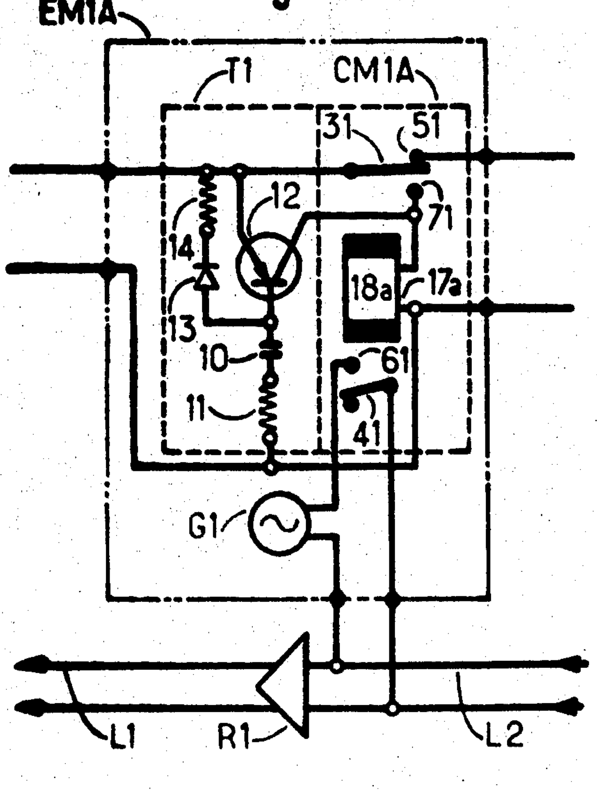

FIG. 3 shows a variant of embodiment of the test transmitter of FIG. 2, for the case of a distant supervision system of the manual transfer type.

In the arrangement of FIG. 3, in the test transmitter EM1A, the holding winding 19 of FIG. 2 has been omitted and the auxiliary holding contact 71 is connected with the common point to winding *18a* of relay *17a* and the collector electrode of transistor 12, the other elements of the transmitter remaining the same. When the operator applies the direct control current to the control circuit A, capacitor 10 is charged and relay *17a* passes to its work position, disconnecting the part of circuit A which extends toward the next transmitter EM2A. A test signal current is applied to the input of repeater R1 and winding *18a* of relay *17a* is energized. Relay *17a* retains its work position even after the charging current has been reduced to an intensity too low for maintaining its armatures in the attracted condition, this as long as switch *Co* is kept in position 2 by the operator's action. The same succession of operations subsequently takes place in the same order as in the case of FIG. 2.

Figure 4:
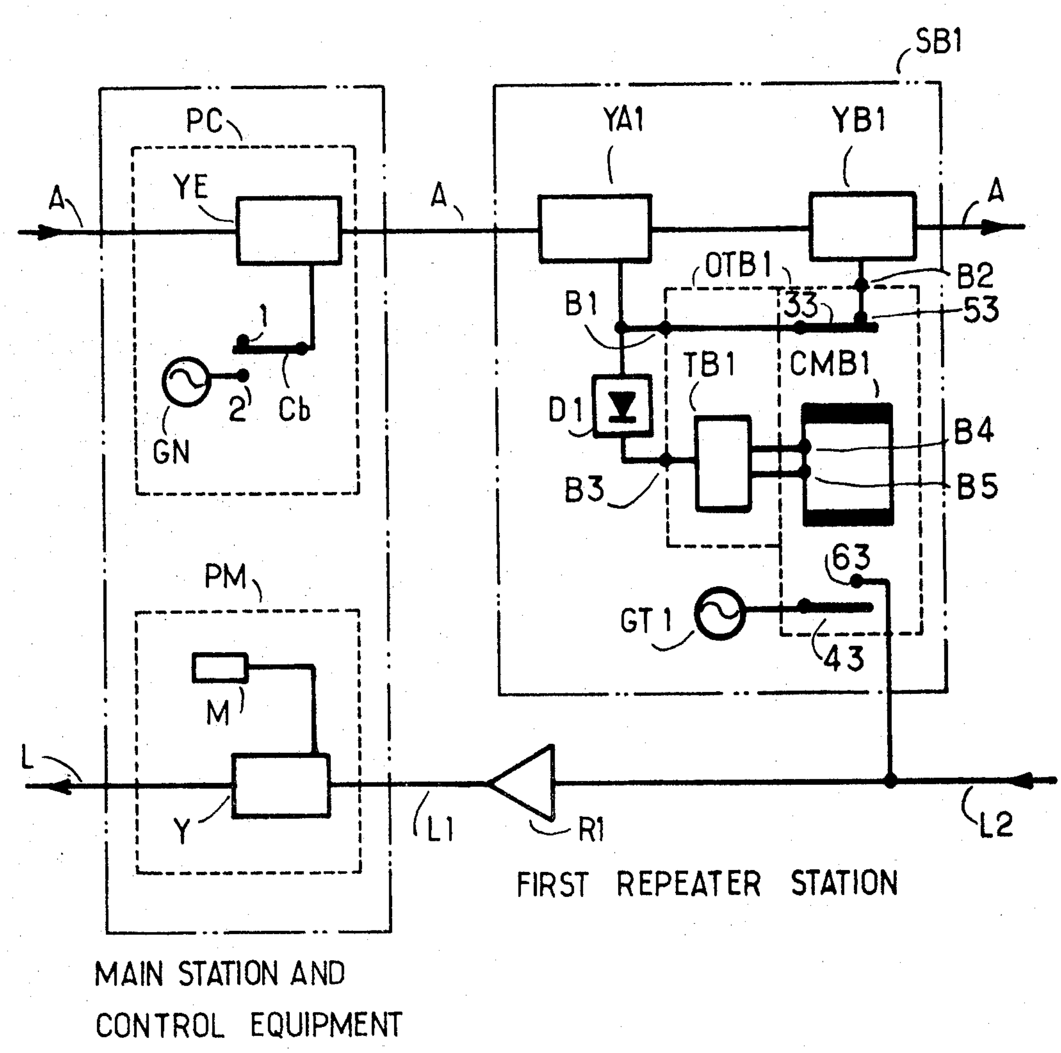
FIG. 4 shows a diagram of an embodiment of the invention, in the case where the control current is an alternating current and the control circuit is a one-way communication circuit, for instance a voice frequency communication circuit, the normal operation of which does not need to be interrupted if the frequency of the control current is so chosen as not to interfere with the communication frequencies.

FIG. 4 shows a single wire diagram of the application of the invention to the supervision of a unidirectional communication circuit, in the case where the control circuit is a voice frequency communication circuit, the normal operation of which should not be interrupted during its use as a control circuit for a repeatered transmission line L.

In FIG. 4, L is the transmission line to be supervised, its transmission direction being shown by the arrows at the right and left ends of the drawing. Said line L comprises line section L1 with a repeater R1 at its input end, at a first repeater station p1; line section L2, with repeater R2 (not shown) at its input end, at a second repeater station P2 (not shown), and so on.

A is the control circuit, which in the present case is the above said voice frequency circuit. Control is effected by means of alternating current, and the direction of control current transmission is shown by the arrows at both ends of circuit A.

The receiving station at which the test operations are effected is represented by a large rectangle at the left part of the FIG., with the control unit PC and the measuring unit PM each represented by a smaller rectangle inside the former one.

The control unit PC comprises a sinusoidal alternating current generator GN, a switch *Cb* having a rest position 1 and a work position 2, and coupling means YE allowing the sinusoidal control current to be applied to the near end of circuit A.

The measuring unit PM comprises branching filter means YR for separating the test current from the communication signals proper and further means M for measuring, by way of example, the level of said test current at its arrival point in the main station.

Supervision equipment such as SB1 is provided in circuit A, in the vicinity of each unattended repeater station. It includes various elements respectively associated with the corresponding repeaters along circuit L. In the drawing, the only equipment shown is SB1, which is associated with the nearest repeater station to the main station. In equipment SB1:

OTB1 is a test member comprising a delayed action device TB1 and a switching member CMB1 (for instance a relay) provided with two armatures 33 and 43, a rest contact 53 and a work contact 63. B4 and B5 are the terminals of a winding provided in CMB1;

YA1 and YB1 are branching filters respectively capable of deriving the control current from circuit A without disturbing the communication currents transmitted therethrough and of reinjecting said control current into the part of A which extends beyond SB1. D1 is a rectifier, and GT1 is a generator delivering the sinusoidal test current.

The structures of elements TB1 and CMB1 are the same as those of elements T1 and CM1 of FIG. 1, respectively. The single wire path between points B1 and B2 (FIG. 4) plays the same part as the two electrical connections A1–31–51–A2 and A3–A4–A5–A6 of FIG. 1, respectively. Referring again to FIG. 4, rectifier D1 supplied a rectified current to element TB1; the single wire path from point B3 through B4 and B5 corresponds to the path A1—transistor 12 emitter-transistor 12 collector—winding 16–A5–A4–A3 of FIG. 1.

The operation of the device of FIG. 4 is as follows:

In the rest condition, switch *Cb* (located at the main station) is in position 1 and member CMB1 (at the unattended station) is in the position in which contact 33–53 is closed, which ensures continuity YA1–B1–B2–YB2. Contact 43–63 is open, and no test current is transmitted to line section L1. The same holds good for the supervision elements of the other repeater stations.

When the operator at the main station puts switch *Cb* (in the control unit PC) in position 2, a sinusoidal test current is transmitted through circuit A.

The frequency of this sinusoidal current must be selected outside the frequency band 300—3400 Hz. (assuming that voice frequency telephone or telegraph currents are transmitted through circuits A and L). The selected frequency for the test current must differ from 4000 Hz., often used as a pilot frequency and from 3825 Hz., normally used as a ringing signal frequency. A test current frequency comprised between 3550 and 3650 Hz. may be selected.

The control current from the main station flowing in circuit A enters equipment SB1, together with the communication frequency signals transmitted through A. The control current is separated from the latter signals by filtering means YA1 and rectified in rectifier D1, which delivers a direct current voltage which, applied to the delayed action device TB1, causes the switching member CMB1 to pass to its work position. In turn, this prevents the sinusoidal test current from being transmitted toward the next repeater station, since contact 33–53 is now open. At the same time, the control current is directed to the input of repeater R1 through the closed contact 43–63.

The just described situation persists for a duration determined by the dimensioning of the delayed action device TB1.

At the end of said duration, the switching member CMB1 automatically returns to its rest position, opening contact 43–63 and thus disconnecting generator GT1 from the input to R1, and at the same time closing contact 33–53 and feeding again the control current to the part of circuit A which lies beyond equipment SB1.

Similar equipment to SB1 is, of course, associated with each unattended repeater station in the supervised communication circuit L, making it possible to effect supervision of all repeaters from the main station.

Figure 5:
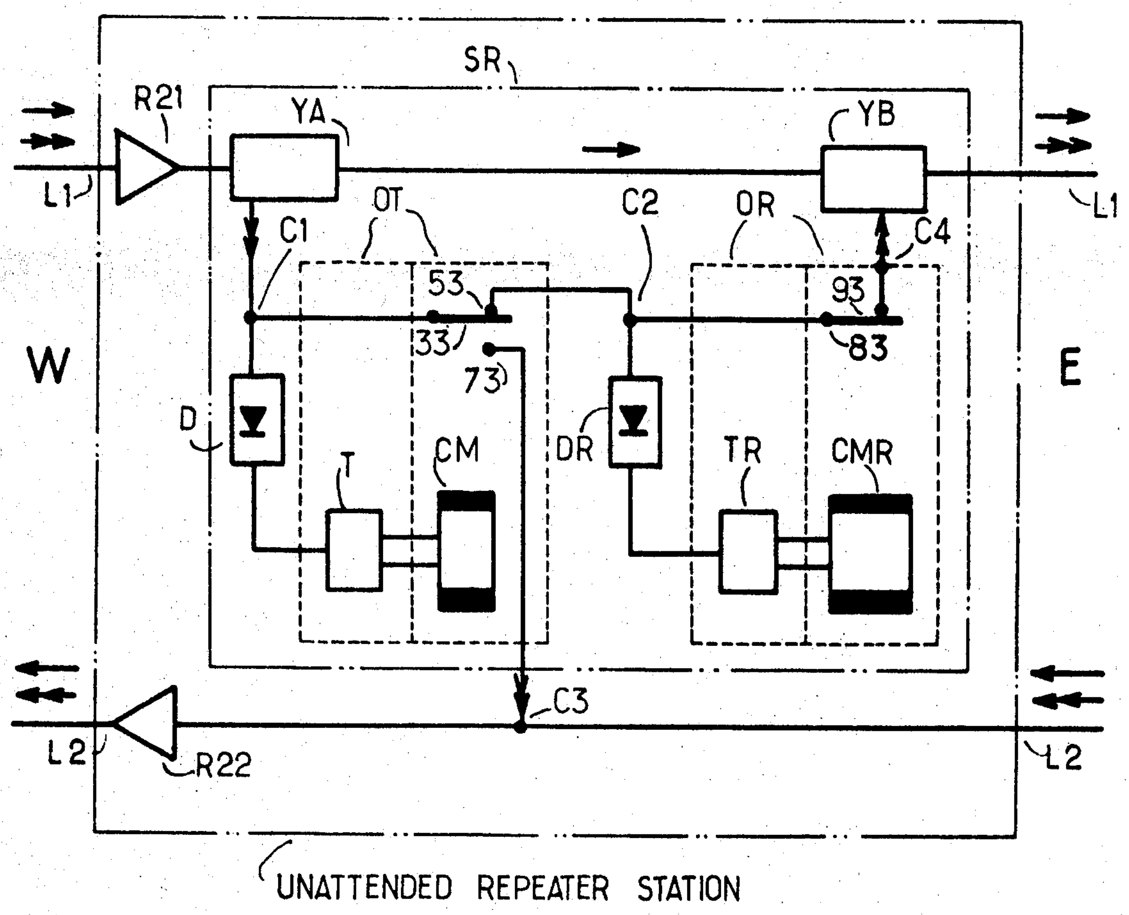
FIG. 5 shows a diagram of an unattended repeater station provided with a supervision equipment according to the invention, using alternating current control and applied to a four-wire communication circuit.

Referring now to FIG. 5, the latter fig FIG. shows, by way of example, a single wire diagram of an arrangement according to the invention, applied to a four-wire communication circuit.

In FIG. 5 is shown the arrangement of an unattended repeater station inserted in the four-wire circuit comprising the West–East transmission line L1 and the East–West transmission line L2, the latter said unattended station including corresponding repeaters R21 and R22. The control unit in the main station is assumed to have the same structure as in FIG. 4.

In FIG. 5, the supervision equipment is designated as SR. The double arrows denote the direction of propagation of the control currents, while the single arrows denote that of the communication signals.

In the particular arrangement of FIG. 5, the control current itself, of a suitably selected frequency, is used as the test current. This is made possible by providing a suitable delay time between the tests effected on two successive line sections. The equipment SR includes for this purpose branching filters YA and YB similar to YA1 and YB1 of FIG. 4. The test unit OT (FIG. 5), which plays a part similar to that of OTB1 in FIG. 4, includes a relay CM provided with a single armature 33 which, in cooperation with a rest contact 53, provides a connection between points C1 and C2; the work contact 73 of this relay connects point C1 at the control current output of filter YA, to a point C3 taken in line L2 and therefrom to the input of repeater R22.

The unit OT does not include any test current generator, since the control current is directly used as the test current. Between points C2 and C4, both in the path of the control current through equipment SR, a delayed switching unit OR, including a delayed action device TR (similar to T of FIG. 4) is inserted. The latter device feeds the winding of a relay CMR (similar to C CMB1 of FIG. 4), provided with a single armature 83 and with a rest contact 93 providing a connection between points C2 and C4.

Rectifiers D and DR, fed from the control current, make it possible to energize the delayed action devices T, TR and the relays by means of direct currents derived from said control current.

To operate the arrangement of FIG. 5, the frequency of the sinusoidal control current generator such as GN of FIG. 4 should be selected outside the frequency bands used for the intelligence signal channels and the pilot and ringing signals. As a matter of fact, the choice of the suitable frequency for the control current depends on the selected transmission system.

For some systems, the available frequency is that defined by international agreements. For instance, in a known I20-channel carrier-current telephone system using balanced lines, the limit frequencies being 60 and 552 KHz., with a 556 kHz. pilot signal, the recommended band is 560—600 kHz.

If the considered carrier-current telephone system does not employ more than three I2-channel basic groups, with an upper frequency limit of 156 KHz., a frequency comprised between 160 and 180 kHz. may conveniently be selected.

The operation of the arrangement of FIG. 5 is then as follows:

When the control current reaches the concerned repeater station, the delayed action device T, fed from the rectified current from D, operated relay CM; contact 33–53 opens, which cuts the C1-C2 connection. At the same time the work contact is established between 33 and 73, and the control current is applied at C3 to the input of repeater R22. The control current is used as the test current for testing line section L2 from the input of repeater R22 in the E–W direction. Of course, the test simultaneously indicates the condition of line L1 in the W–E direction up to repeater R21 inclusively.

After a time interval equal to the time constant of the delayed action device T has elapsed, armature 33 closes contact 33–53 again; TR is energized through rectifier DR and the attracted armature 83 opens contact 83–93, which opens the control current connection between C2 and C4. No test current is then transmitted toward the measuring unit at the main station, and this condition persists for a duration equal to the time constant of the delayed action device TR. At the end of the latter duration, relay CMR closes contact 83–93 again, which connects C2 to C4 and causes the control current to be injected into line L1 through filter YB.

In the next repeater station, the operations follow in the same order. During a certain time interval, the control current is applied as a test current to line L2; thereafter, during another time interval, no test current is supplied to the considered repeater station. At the end of the latter time interval, the control current is transmitted again to the next repeater station, and subsequently used as a test current for another repeater in line L2, and so on. All repeater stations are thus successively tested.

The just described embodiments of the invention adapted to the case of a four-wire communication circuit, offer a particular advantage. Since the two line lengths comprised between the main station and the momentarily intervening unattended station are simultaneously flown through in opposite directions by the same test u current, both said line lengths and the associated repeaters are simultaneously tested. If a fault exists at some point in the circuit, it generally affects but a single transmission direction and is immediately signalled as soon as it occurs. The result of the test being known, there is not ambiguity about the defective line section, despite the fact that testing has been effected on both sections at the same time.

We claim:

1. In a communication circuit having a transmitting far end and a receiving near end and including a plurality of unattended repeater stations located at increasing distances along said circuit from said near end and from a main station located at said near end, each of said unattended stations including a repeater having an input and an output with its amplification direction from said far end to said near end, a distant supervision system allowing said repeaters to be separately and successively tested from said main station, said supervision system comprising:

test signal supply means at each of said unattended stations for supplying thereto a test signal alternating current capable of being transmitted through said communication circuit;

a control current source isolated from said communication circuit and a manually operated switch for said source both located at said main station for applying said control current to a two-wire control circuit arranged along a path substantially coinciding with that of said communication circuit;

at each of said unattended stations, local switching means including a relay having a winding operated by said control current from said control circuit for connecting through contacts borne by said relay said test signal supply means to said input of said repeater and for switching off through further contacts borne by said relay the part of said control circuit which extends towards the far end of said communication circuit;

delayed action switching means controlled through said two-wire circuit by said control current at each of said unattended stations for releasing after a predetermined time interval said relay and switching in again said part of said control circuit;

said local and delayed action switching means being so arranged as to successively operate in the order of the increasing distances of said unattended stations;

measuring instrument means provided at said main station for checking the level of the test signals received at said main station through said repeaters through said communication circuit;

said delayed action switching means comprising a transistor having its collector-emitter path series connected with said winding between the two wires of said two-wire circuit and its base-emitter path series connected with the series assembly of a resistor and capacitor between latter said two wires; and said control circuit being a two-wire metallic circuit, having no wire in common with said communication circuit.

2. A supervision system as claimed in claim 1, in which said control current is an alternating current of a given frequency, and in which rectifiers are provided for deenergizing said local and delayed action switching means from said control current.

3. A supervision system as claimed in claim 1, in which said control current source is a direct current source.

4. A supervision system as claimed in claim 1, in which said test signal supply means consist of a test signal generator located at each of said unattended stations.

5. A supervision system as claimed in claim 1, in which said test signal supply means in each unattended station consist of a local test signal generator, and in which all of said generators have a common frequency.

6. A supervision system as claimed in claim 1, in which said test signal supply means in each unattended station comprises a local test signal generator, and in which at least part of the total number of said generators produce different frequencies.